US008202939B2

(12) United States Patent
Moore et al.

(10) Patent No.: US 8,202,939 B2
(45) Date of Patent: Jun. 19, 2012

(54) CURABLE ELASTOMER COMPOSITIONS

(75) Inventors: Robert Moore, South Glamorgan (GB); Michael Proctor, Llanmaes (GB)

(73) Assignee: Dow Corning Corporation, Midland, MI (US)

( * ) Notice: Subject to any disclaimer, the term of this patent is extended or adjusted under 35 U.S.C. 154(b) by 413 days.

(21) Appl. No.: 12/445,092

(22) PCT Filed: Sep. 19, 2007

(86) PCT No.: PCT/GB2007/050563
§ 371 (c)(1),
(2), (4) Date: Dec. 2, 2009

(87) PCT Pub. No.: WO2008/044063
PCT Pub. Date: Apr. 17, 2008

(65) Prior Publication Data
US 2010/0076144 A1    Mar. 25, 2010

(30) Foreign Application Priority Data

Oct. 10, 2006   (GB) .................................. 0619952.5

(51) Int. Cl.
*C08L 83/05* (2006.01)
(52) U.S. Cl. ......... 525/105; 525/106; 525/100; 525/474
(58) Field of Classification Search .................. 525/100, 525/105, 106, 474
See application file for complete search history.

(56) References Cited

U.S. PATENT DOCUMENTS

| | | | |
|---|---|---|---|
| 3,419,593 A | 12/1968 | Willing | |
| 3,445,420 A | 5/1969 | Kookootsedes et al. | |
| 3,637,576 A * | 1/1972 | Sutherland et al. | 523/138 |
| 3,709,848 A * | 1/1973 | Gerstin et al. | 524/322 |
| 3,715,334 A | 2/1973 | Karstedt | |
| 3,814,730 A | 6/1974 | Karstedt | |
| 3,923,705 A | 12/1975 | Smith | |
| 3,989,667 A | 11/1976 | Lee et al. | |
| 4,201,698 A | 5/1980 | Itoh et al. | |
| 4,904,761 A * | 2/1990 | Okitsu et al. | 523/435 |
| 5,010,137 A * | 4/1991 | Umeda et al. | 525/104 |
| 5,175,325 A | 12/1992 | Brown et al. | |
| 6,184,295 B1 | 2/2001 | Okuyama | |
| 2008/0045648 A1 * | 2/2008 | Bayon et al. | 524/588 |

FOREIGN PATENT DOCUMENTS

| | | |
|---|---|---|
| WO | WO 03091349 A1 | 11/2003 |
| WO | WO 2004094550 A1 | 11/2004 |

OTHER PUBLICATIONS

PCT International Search Report for PCT/GB2007/050563 dated Jan. 30, 2008, 3 pages.

* cited by examiner

*Primary Examiner* — Margaret Moore
(74) *Attorney, Agent, or Firm* — Howard & Howard Attorneys PLLC

(57) ABSTRACT

A formable curable elastomer composition comprising a dispersion of a cured organic elastomer, such as EPDM, butyl rubber and hydrogenated nitrile butyl rubber, is provided in an uncured silicone elastomer. The organic elastomer is cured by a phenol-formaldehyde resin. These compositions can generally be used in applications where silicone rubber is used, and in particular where the cured rubber is liable to be exposed to temperatures of 150-200° C. Examples of such uses include tyre bladders used in the moulding of tyres, spark plug boots for internal combustion engines, wire and cable coatings designed to be used at high temperatures and ceramifiable wire and cable coatings used in safety critical applications such as emergency lighting systems.

20 Claims, No Drawings

CURABLE ELASTOMER COMPOSITIONS

RELATED APPLICATIONS

This application claims priority to all the advantages of International Patent Application No. PCT/GB2007/050563, filed Sep. 19, 2007, which claims priority to Great Britain Patent Application No. GB 0619952.5, filed on Oct. 10, 2006.

This invention relates to curable elastomer compositions comprising a silicone elastomer and an organic elastomer. By an organic elastomer we mean an elastomer which does not contain any silicone. The invention also relates to cured elastomer compositions comprising a silicone elastomer and an organic elastomer and to processes for the production of such curable and cured elastomer compositions.

Silicone elastomers are valued for their ability to retain their physical properties, in particular their elasticity, despite prolonged exposure to high temperature, for example temperatures of 150 to 200° C. Organic elastomers such as EPDM and butyl rubber are generally less expensive than silicone elastomers but have lower resistance to prolonged heating.

A formable curable elastomer composition according to the invention comprises a dispersion of a cured organic elastomer in an uncured silicone elastomer, wherein said organic elastomer is cured by a phenol-formaldehyde resin. The uncured silicone elastomer is a silicone that can be cured to form a silicone elastomer by a conventional curing agent, for instance an organic peroxide. The formable curable elastomer composition may be free of silicone elastomer curing agent or may contain such a curing agent. Examples of organic elastomers that can be cured by phenol formaldehyde resins include EPDM elastomers, butyl rubbers, nitrile butyl rubbers, hydrogenated nitrile butyl rubbers (HNBR elastomers) and acrylic elastomers.

A cured elastomer composition according to the invention comprises a dispersion of a cured organic elastomer in a cured silicone elastomer, wherein said organic elastomer is cured by a phenol-formaldehyde resin.

The invention also includes a formable curable elastomer composition comprising a dispersion of a curable organic elastomer compound in an uncured silicone rubber free of curing agent, wherein said curable organic elastomer compound comprises an organic elastomer and a phenol-formaldehyde resin curing agent capable of curing the organic elastomer.

A process according to the invention for the preparation of a formable curable elastomer composition comprises dispersing a curable organic elastomer compound in an uncured silicone elastomer free of curing agent and heating the composition to cure the organic elastomer compound, wherein said curable organic elastomer compound comprises an organic elastomer and a phenol-formaldehyde resin curing agent capable of curing the organic elastomer.

A process according to the invention for the preparation of a cured elastomer composition comprising mixing a formable curable organic elastomer composition as described above with a curing agent for the silicone elastomer and heating to cure the silicone elastomer.

We have found that the cured elastomer compositions according to the invention have enhanced thermal stability compared to most compositions containing organic elastomers such as EPDM, butyl rubbers or hydrogenated nitrile butyl rubbers. For example, EPDM elastomers can be cured using peroxides. Blends of silicone elastomer and EPDM elastomer can be cured in one curing operation by peroxides, but we have found that the compositions according to the invention in which the EPDM is cured by a phenol-formaldehyde resin curing agent have much enhanced thermal stability compared to blends of silicone rubber and EPDM cured by peroxide.

We have found that even in the absence of silicone elastomer EPDM elastomers and HNBR elastomers cured by a phenol-formaldehyde resin curing agent have superior thermal stability compared to EPDM elastomers or HNBR elastomers cured by peroxide. The invention thus includes the use of an EPDM or HNBR elastomer in an environment in which the elastomer is subjected to temperatures of at least 150° C., characterised in that the EPDM or HNBR elastomer is cured by a phenol-formaldehyde resin to enhance the thermal stability of the EPDM or HNBR elastomer.

An EPDM elastomer is a terpolymer of ethylene, propylene and a minor proportion (generally less than 5% by weight and often less than 1%) of a diene, usually a non-conjugated diene. Examples of dienes used in EPDM elastomers are ethylidenenorbornene, particularly 5-ethylidene-2-norbornene, 1,4-hexadiene, 5-methylene-2-norbornene, 5-vinyl norbornene, 1,6-octadiene, 5-methyl-1,4-hexadiene, 3,7-dimethyl-1,6-octadiene, 1,3-cyclopentadiene, 1,4-cyclopentadiene and dicyclopentadiene. An example of a commercially available EPDM elastomer that we have found to be effective in the compositions of the invention is sold by Dow Chemical Company under the Trade Name 'Nordel IP 4725P'. EPDM elastomers are usually cured by sulphur or by peroxide in commercial use, although curing by phenol-formaldehyde resin has been described. Functionalised EPDMs are commercially available. Such functionalised EPDMs can be present as part or all of the organic elastomer component and may improve compatibility of the organic elastomer and silicone elastomer.

Butyl rubber is a copolymer of an isoolefin, usually isobutylene (2-methylpentene), with a minor amount, generally less than 20%, of a conjugated diene such as isoprene or butadiene. The butyl rubber can be a terpolymer containing a further olefinically unsaturated comonomer. An example of butyl rubber which we have found to be effective in the compositions of the invention is sold by Lanxess AG under the Tradename 'butyl 301'

HNBRs are formed from isobutylene, a conjugated diene and an unsaturated nitrile such as acrylonitrile, and are partially hydrogenated after copolymerisation. An example of a commercially available HNBR which we have found to be effective in the compositions of the invention is sold by Bayer AG under the Trade Mark 'Therban AT'. Blends of elastomers selected from EPDM elastomers, butyl rubbers and hydrogenated nitrile butyl rubbers can be used. For example butyl rubber or HNBR can be blended with EPDM which may improve compatibility with the silicone rubber.

The silicone elastomer used in the present invention is of a type often known as high temperature vulcanising (HTV) silicone rubber or high consistency silicone rubber (HCR). It is generally based on a substantially linear high molecular weight silicone polymer such as a polysiloxane gum having a viscosity of 1,000,000 mPa·s at 25° C. or more. These polysiloxane gums generally contain a siloxane backbone (—Si—O—) to which are linked alkyl groups such as methyl, ethyl, propyl, isopropyl or t-butyl groups, generally methyl groups, and alkenyl groups such as vinyl, allyl, 1-propenyl, isopropenyl, or hexenyl groups. Vinyl groups may be present together with hydroxyl groups and silicon hydride groups which assist in their cross-linking. Such polysiloxane gums typically have a degree of polymerisation (DP) of 500-20,000, which represents the number of repeating units in the polymer. More preferably the DP is at least 1200. Because of their very high viscosity these stiff gum-like polymers are often described by way of their (Williams) plasticity Number rather than viscosity as the measurement of viscosity becomes exceptionally difficult in gum-like polymers. Typically gums have a (Williams) plasticity number (in accordance with ASTM D926) in the range of from about 30 to 250. The plasticity number, as used herein, is defined as the thickness in millimeters×100 of a cylindrical test specimen 2 cubic cm in volume and approximately 10 mm in height after the specimen has been subjected to a compressive load of 49 Newtons for three minutes at 25° C. These silicone elastomers can be cured with a range of curing agents. The most frequently used curing agents are peroxides, or hydrosilylation catalysts used in conjunction with hydride (Si—H) functional polysiloxanes.

The silicone elastomer phase of the compositions of this invention may contain, as optional constituents, other ingredients which are widely used in the formulation of silicone rubber products. For example, the compositions may contain one or more finely divided reinforcing fillers, preferably a silica filler such as a high surface area fumed or precipitated silica, or a carbon black filler. Calcium carbonate and/or additional non-reinforcing fillers such as crushed quartz, diatomaceous earths, barium sulphate, iron oxide, titanium dioxide, talc, aluminite, calcium sulphate, magnesium carbonate, clays such as kaolin, aluminium trihydroxide or wollastonite can additionally or alternatively be present in the silicone elastomer. The filler may be surface treated, for example with a fatty acid or a fatty acid ester such as a stearate, or with an organosilane, organosiloxane, organosilazane or short chain siloxane diol to render the filler hydrophobic and thus easier to disperse in the silicone elastomer.

The phenol-formaldehyde resin which is used to cure the organic elastomer is generally the condensation product of an alkyl-substituted phenol, generally containing at least one alkyl substituent having 1 to 10 carbon atoms, a halogen-substituted phenol or an unsubstituted phenol, with formaldehyde in an alkaline medium. The phenol-formaldehyde resin can be the condensation product of a bis(methylol) phenol which is itself a reaction product of a phenol with formaldehyde. The phenol-formaldehyde resin is preferably a halogen-containing resin or is used in conjunction with a halogen donor. The halogen-containing phenol-formaldehyde resin can be the condensation product of a halogen-substituted phenol with formaldehyde or produced by halogenation of a phenol-formaldehyde resin. One preferred example of a resin curing agent is a halogenated, e.g. brominated, alkylphenol formaldehyde resin. Such a halogenated resin may for example contain 2 to 10% by weight of a halogen such as bromine or chlorine. One suitable commercially available curing agent is that sold by Schenectady International under the Trade Name 'SP1055'.

The halogen donor used with a resin which does not contain halogen, for example an alkylphenol formaldehyde resin, can for example be a halide of a transition metal such as stannous chloride or ferric chloride or a halogenated polymer such as chlorinated paraffin, chlorinated polyethylene, chlorosulphonated polyethylene or polychlorobutadiene. Such a halogen donor can for example be present at 2 to 10% by weight based on the resin.

When the phenol-formaldehyde resin is preferably a halogen-containing resin or is used in conjunction with a halogen donor, it is preferably used in conjunction with a hydrogen halide scavenger such as a metal oxide. The preferred metal oxide is zinc oxide which is also believed to catalyse the cross-linking function of the phenol-formaldehyde resin. The zinc oxide can for example be present at 2 to 75% by weight based on the resin, particularly 10 to 50%. Alternative hydrogen halide scavengers include iron oxide, magnesium oxide, titanium dioxide or magnesium silicate.

In one preferred process according to the invention, a curable organic elastomer compound, comprising an organic elastomer, and a phenol-formaldehyde resin curing agent, is dispersed in an uncured silicone elastomer free of curing agent. The curable organic elastomer compound can be produced by compounding an organic elastomer curable by phenol-formaldehyde resin with the resin curing agent and any associated material such as a halogen donor and/or a hydrogen halide scavenger. The curable organic elastomer compound may contain additional ingredients, for example it may advantageously contain one or more fillers, particularly a reinforcing filler such as silica or carbon black or any of the fillers described above. The proportion of such fillers when employed will depend on the properties desired in the cured elastomer product. Usually the filler content of the curable organic elastomer compound will be in the range from about 5 to about 150 parts by weight per 100 parts by weight of the EPDM or other polymer. Other ingredients which may be included in the curable elastomer blend include but are not restricted to rheological modifiers, for example plasticizers or extenders which lower the viscosity of an organic elastomer such as EPDM, agents to improve compatibility of the organic elastomer and silicone elastomer phases, pigments, heat stabilizers, flame retardants, UV stabilizers and antioxidants. A low molecular weight polysiloxane, for example a silanol-terminated short chain polydimethylsiloxane, can act as a rheological modifier (plasticizer) and as a compatibilitising agent.

The organic elastomer and the curing resin and any other ingredients can for example be mixed in a Z-blade mixer to form the curable organic elastomer compound. The organic elastomer can if desired be premixed with the filler(s) before mixing with the curing resin.

The curable organic elastomer compound thus produced is mixed with an uncured silicone elastomer free of curing agent. The silicone elastomer may be premixed with a filler, particularly a reinforcing filler as discussed above. The silicone elastomer can for example contain from about 5 to about 150 parts by weight filler per 100 parts by weight of silicone polymer. The silicone elastomer may also contain other ingredients such as a rheological modifier, pigment, heat stabilizer, flame retardant, UV stabilizer and/or antioxidant.

The curable organic elastomer compound and the silicone elastomer are generally mixed in proportions such that the weight ratio of curable organic elastomer to silicone elastomer is from 5:95 up to about 50:50 or 60:40. The most advantageous results are obtained at weight ratios of curable organic elastomer to silicone elastomer of from 10:90 or 20:80 up to about 40:60 and particularly up to about 30:70, where the organic elastomer modifies the mechanical properties of the cured product without affecting processability of the uncured silicone elastomer or significantly reducing the thermal resistance of the cured product.

The curable organic elastomer compound and the curing agent-free silicone elastomer composition can be mixed in a high shear mixer suitable for mixing two polymers. Some examples are, but not limited to, an internal mixer such as a Banbury mixer, a Buss co-kneader, a cavity transfer mixer and a twin screw extruder. Alternatively a Z-blade mixer can be used. The curable organic elastomer compound can be heated to a temperature above ambient but below its cure temperature, for example a temperature in the range from about 50° C. to about 100° C., to melt the organic elastomer so that it can more easily be mixed with the silicone elastomer.

In an alternative process, the organic elastomer can be mixed into the silicone elastomer before the phenol formaldehyde resin is added. The organic elastomer can be premixed with one or more additional ingredients such as a filler. After the organic elastomer has been dispersed throughout the silicone elastomer, the phenol formaldehyde resin can be mixed into the composition. Since the phenol formaldehyde resin does not react with the silicone elastomer and has no affinity for the silicone elastomer, the phenol formaldehyde resin dissolves into the organic elastomer and can cure the organic elastomer on subsequent heating. In a further alternative, the organic elastomer can be premixed with the phenol-formaldehyde resin but with the zinc oxide being added after mixing with the silicone elastomer.

After the curable organic elastomer compound and the curing agent-free silicone rubber composition have been mixed sufficiently to give a good dispersion of the curable organic elastomer compound in the silicone elastomer, the composition is heated to cure the organic elastomer compound. The curable organic elastomer compound is preferably cured by dynamic vulcanisation, that is to say mixing of the composition continues while heat is applied to cure the organic elastomer compound. In many cases the heat generated by shearing of the mixture during mixing may generate a high enough temperature for cure. The cure temperature of the curable organic elastomer compound is usually in the range from about 150° C. to about 200° C. To maximise thermal stability, especially when curing EPDM or HNBR elastomers, the organic elastomer should be fully cured, for example by heating for at least 15 or 20 minutes at 170° C.

The product of this curing step, comprising a dispersion of a cured organic elastomer compound in an uncured silicone elastomer, is formable, that is it can be made to flow and can be shaped by processes such as injection moulding, extrusion, blow moulding or calendering. The dispersion of cured organic elastomer compound in uncured silicone elastomer can in general be processed in all the ways known for uncured silicone elastomer compositions.

The composition comprising a dispersion of a cured organic elastomer compound in an uncured silicone elastomer is cured by mixing with a curing agent suitable to cure the silicone elastomer and heating to cure the silicone elastomer. Other components of the silicone elastomer composition, for example a filler such as silica, can be present when the silicone elastomer is mixed with the organic elastomer or can be added after the organic elastomer has been cured. Usually the composition is mixed with the curing agent, then formed into the desired product shape and then heated to cure the silicone elastomer. The cure temperature of the silicone elastomer is generally in the range from about 115° C. to about 200° C.

Examples of curing agents suitable for the cure of silicone elastomers include organic peroxides, for example, dialkyl peroxides, diphenyl peroxides, benzoyl peroxide, 1,4-dichlorobenzoyl peroxide, 2,4-dichlorobenzoyl peroxide, di-t-butyl peroxide, dicumyl peroxide, tertiary butyl-perbenzoate, monochlorobenzoyl peroxide, ditertiary-butyl peroxide, 2,5-bis-(tertiarybutyl-peroxy)-2,5-dimethylhexane, tertiary-butyl-trimethyl peroxide, tertiary-butyl-tertiary-butyl-tertiary-triphenyl peroxide, 1,1-bis(t-butylperoxy)-3,3,5-trimethylcyclohexane, and t-butyl perbenzoate. Such organic peroxides are used at up to 10 parts by weight per 100 parts silicone rubber, preferably between 0.2 and 2 parts of peroxide are used.

An alternative curing system known for silicone elastomers comprises a complex of hydrosilylation catalyst (typically platinum based) used in conjunction with a polyalkylsiloxane hydride, for example a poly(methyl hydrogen) siloxane. This curing system is used for silicone elastomers which are vinyl functional polyalkylsiloxane polymers.

Hydrosilylation catalysts are illustrated by the following; chloroplatinic acid, alcohol modified chloroplatinic acids, olefin complexes of chloroplatinic acid, complexes of chloroplatinic acid and divinyltetramethyldisiloxane, fine platinum particles adsorbed on carbon carriers, platinum supported on metal oxide carriers such as $Pt(Al_2O_3)$, platinum black, platinum acetylacetonate, platinum(divinyltetramethyldisiloxane), platinous halides exemplified by $PtCl_2$, $PtCl_4$, $Pt(CN)_2$, complexes of platinous halides with unsaturated compounds exemplified by ethylene, propylene, and organovinylsiloxanes, styrene hexamethyldiplatinum, Such noble metal catalysts are described in U.S. Pat. No. 3,923,705, incorporated herein by reference to show platinum catalysts. One preferred platinum catalyst is Karstedt's catalyst, which is described in Karstedt's U.S. Pat. Nos. 3,715,334 and 3,814,730, incorporated herein by reference. Karstedt's catalyst is a platinum divinyl tetramethyl disiloxane complex typically containing one weight percent of platinum in a solvent such as toluene. Another preferred platinum catalyst is a reaction product of chloroplatinic acid and an organosilicon compound containing terminal aliphatic unsaturation. It is described in U.S. Pat. No. 3,419,593, incorporated herein by reference. Most preferred as the catalyst is a neutralized complex of platinous chloride and divinyl tetramethyl disiloxane, for example as described in U.S. Pat. No. 5,175,325.

Ruthenium catalysts such as $RhCl_3(Bu_2S)_3$ and ruthenium carbonyl compounds such as ruthenium 1,1,1-trifluoroacetylacetonate, ruthenium acetylacetonate and triruthinium dodecacarbonyl or a ruthenium 1,3-ketoenolate may alternatively be used.

Other hydrosilylation catalysts suitable for use in the present invention include for example rhodium catalysts such as $[Rh(O_2CCH_3)_2]_2$, $Rh(O_2CCH_3)_3$, $Rh_2(C_8H_{15}O_2)_4$, $Rh(C_5H_7O_2)_3$, $Rh(C_5H_7O_2)(CO)_2$, $Rh(CO)[Ph_3P](C_5H_7O_2)$, $RhX^4_3[(R^3)_2S]_3$, $(R^2_3P)_2Rh(CO)X^4$, $(R^2_3P)_2Rh(CO)H$, $Rh_2X^4_2Y^4_4$, $H_aRh_bolefin_cCl_d$, $Rh(O(CO)R^3)_{3-n}(OH)_n$ where $X^4$ is hydrogen, chlorine, bromine or iodine, $Y^4$ is an alkyl group, such as methyl or ethyl, CO, $C_8H_{14}$ or 0.5 $C_8H_{12}$, $R^3$ is an alkyl radical, cycloalkyl radical or aryl radical and $R^2$ is an alkyl radical an aryl radical or an oxygen substituted radical, a is 0 or 1, b is 1 or 2, c is a whole number from 1 to 4 inclusive and d is 2, 3 or 4, n is 0 or 1. Any suitable iridium catalysts such as $Ir(OOCCH_3)_3$, $Ir(C_5H_7O_2)_3$, $[Ir(Z^2)(En)_2]_2$, or $(Ir(Z^2)(Dien)]_2$, where $Z^2$ is chlorine, bromine, iodine, or alkoxy, En is an olefin and Dien is cyclooctadiene may also be used.

To effect curing of the present composition, the organohydrogensiloxane cross-linker must contain more than two silicon bonded hydrogen atoms per molecule. The organohydrogensiloxane can contain, for example, from about 4-20 silicon atoms per molecule, and but could have a viscosity of up to about 10 Pa·s at 25° C. The silicon-bonded organic groups present in the organohydrogensiloxane can include substituted and unsubstituted alkyl groups of 1-4 carbon atoms that are otherwise free of ethylenic or acetylenic unsaturation. The organohydrogensiloxane which functions as a cross-linker contains an average of at least two silicon-bonded hydrogen atoms per molecule, and no more than one silicon-bonded hydrogen atom per silicon atom, the remaining valences of the silicon atoms being satisfied by divalent oxygen atoms or by monovalent hydrocarbon radicals comprising one to seven carbon atoms. The monovalent hydrocarbon radicals can be, for examples, alkyls such as methyl, ethyl, propyl, tertiary butyl, and hexyl; cylcoalkyls such as cyclohexyl; and aryls such as phenyl and tolyl. Such materials are well known in the art. The molecular structure of the organohydrogensiloxane may be linear, linear including branching, cyclic, or network-form or mixture thereof. There are no particular restrictions on the molecular weight of the organohydrogensiloxane, however it is preferable that the viscosity at 25° C. be 3 to 10,000 mPa·s. Furthermore, the amount of cross-linker that is added to the composition is an amount such that the ratio of the number of moles of hydrogen atoms bonded to silicon atoms to the number of moles of alkenyl groups in the polymer and extender/plasticiser is in the range of 0.5:1 to 20:1, and preferably in the range of 1:1 to 5:1. If this molar ratio is less than 0.5, curing of the present composition becomes insufficient, while if this molar ratio exceeds 20 hydrogen gas is evolved so that foaming occurs.

In this case curing such compositions the hydrosilylation catalyst may be added to the present composition in an amount equivalent to as little as 0.001 part by weight of elemental platinum group metal, per one million parts (ppm) of the composition. Preferably, the concentration of the hydrosilylation catalyst in the composition is that capable of providing the equivalent of at least 1 part per million of elemental platinum group metal. A catalyst concentration providing the equivalent of about 3-50 parts per million of elemental platinum group metal is generally the amount preferred.

Optionally when the cure catalyst is a hydrosilylation catalyst particularly a platinum based catalyst a suitable hydrosilylation catalyst inhibitor may be required. Any suitable platinum group type inhibitor may be used. One useful type of platinum catalyst inhibitor is described in U.S. Pat. No. 3,445, 420, which is hereby incorporated by reference to show certain acetylenic inhibitors and their use. A preferred class of acetylenic inhibitors are the acetylenic alcohols, especially 2-methyl-3-butyn-2-ol and/or 1-ethynyl-2-cyclohexanol which suppress the activity of a platinum-based catalyst at 25° C. A second type of platinum catalyst inhibitor is described in U.S. Pat. No. 3,989,667, which is hereby incorporated by reference to show certain olefinic siloxanes, their preparation and their use as platinum catalyst inhibitors. A third type of platinum catalyst inhibitor includes polymethylvinylcyclosiloxanes having three to six methylvinylsiloxane units per molecule.

An advantage of the curing process of the invention is that a distinct separate cure of the organic elastomer phase into the silicone phase can be achieved. Thus the silicone organic elastomer blend remains formable, allowing easy processing, until it is desired to cure the silicone elastomer phase as well. A further advantage is that thermal stability of the cured organic elastomer is enhanced over the stability obtained by curing the organic elastomer with peroxide.

The curable elastomer compositions of the invention can generally be used in applications where silicone rubber is used, and in particular where the cured rubber is liable to be exposed to temperatures of 150-200° C. One example of such a use is in compounds used to make tyre bladders used in the moulding of tyres. Other examples are spark plug boots for internal combustion engines, wire and cable coatings designed to be used at high temperatures and ceramifiable wire and cable coatings used in safety critical applications such as emergency lighting systems.

The invention is illustrated by the following non-limiting Examples in which: —Tensile Strength results were obtained in accordance with ISO 37: 1994 Type 2; Elongation at Break were obtained in accordance with ISO 34: 1994 Type 2; Durometer Shore A Hardness results were obtained in accordance with BS ISO EN 868:2003; Tear Strength results were obtained in accordance with ASTM 624-98, Die B and. All viscosities values provided were at 25° C. unless otherwise indicated.

EXAMPLE 1

'Nordel IP 4725P' EPDM was compounded with fumed silica sold under the trade name 'Cab-O-Sil MS 75D' and a silanol-terminated polydimethylsiloxane of viscosity about 20 mPa·s at 25° C. to give a composition consisting of 20% by weight of fumed silica, 5% by weight of silanol terminated polydimethylsiloxane and 75% by weight of Nordel IP 4725P. The resulting material was blended with 5% zinc oxide and 10% 'SP 1055' brominated alkylphenol formaldehyde resin to form an EPDM masterbatch, hereafter referred to as EPDM MB1

A mixture of equal proportions by weight of a dimethylvinyl siloxy terminated dimethyl methylvinyl siloxane gum, having a plasticity of from 55 to 65 mils (Gum 1) and of a dimethylvinyl siloxy terminated dimethyl siloxane gum, having a plasticity of from 55 to 65 mils (Gum 2) were compounded with Cab-O-Sil MS 75D fumed silica (from Cabot Corporation) and 5% of the above silanol-terminated polydimethylsiloxane to form a silicone elastomer masterbatch containing 20% by weight of Cab-O-Sil MS75D, 5% by weight of silanol terminated polydimethylsiloxane and the balance consisting of the mixture in equal proportions of Gum1 and Gum-2, hereafter referred to as Silicone MB1.

EPDM MB1 was melted by heating to 75° C. in a Brabender Z-blade mixer. Silicone MB1 was then added to give a volume ratio of EPDM to silicone of 30:70. Mixing of silicone MB1 and EPDM MB1 was continued to give a dispersion of EPDM MB1 in Silicone MB1. The temperature of the mixer was then raised to 170° C. and mixing was continued at this temperature for 30 minutes to effect dynamic vulcanisation of EPDM MB1. The product was a visibly homogeneous dispersion of cured EPDM elastomer in uncured Silicone MB1.

This product was compounded with 0.6% by weight dicumyl peroxide based on silicone elastomer and was moulded into a test sheet. The sheet was cured by heating under pressure in an enclosed metal mould at 170° C. for 10 minutes. The mechanical properties of the cured test sheet were measured and are recorded in Table 1.

EXAMPLE 2

'Nordel IP 4725P' EPDM was compounded with fumed silica sold under the trade name 'Cab-O-Sil MS 75D' and a silanol-terminated polydimethylsiloxane of viscosity about 20 mPa·s at 25° C. to give a composition free of curing agent consisting of 20% by weight of fumed silica, 5% by weight of silanol terminated polydimethylsiloxane and 75% by weight of Nordel IP 4725P, hereafter referred to as EPDM MB2. EPDM MB2 was mixed with Silicone MB1 to give a volume ratio of EPDM to silicone of 30:70. Mixing was continued to melt EPDM MB2 by shear heating and to disperse it into Silicone MB1.

5% zinc oxide and 10% 'SP 1055' brominated alkylphenol formaldehyde resin, based on the weight of EPDM, were added to the dispersion and mixing was continued as the temperature was raised to 170° C. to effect dynamic vulcanisation of the EPDM.

The resulting product was compounded with 0.6% by weight dicumyl peroxide based on silicone elastomer and was moulded into a test sheet. The sheet was cured by heating under pressure in an enclosed metal mould at 170° C. for 10 minutes. The mechanical properties of the cured test sheet were measured and are recorded in Table 1

EXAMPLE 3

Example 2 was repeated with the difference that the EPDM MB2 was mixed with Silicone MB1 to give a volume ratio of EPDM to silicone of 50:50. The mechanical properties of the cured test sheet are recorded in Table 1.

EXAMPLE 4

EPDM MB1 was moulded into a test sheet. The sheet was cured by heating under pressure in an enclosed metal mould at 170° C. for 10 minutes. The mechanical properties of the cured test sheet were measured and are recorded in Table 1.

EXAMPLE 5

Silicone MB1 was mixed with 0.6% by weight dicumyl peroxide. It was then moulded into a test sheet. The sheet was cured by heating under pressure in an enclosed metal mould at 170° C. for 10 minutes. The mechanical properties of the cured test sheet were measured and are recorded in Table 1.

COMPARATIVE EXAMPLE C1

EPDM MB2 was melted by heating to 75° C. in a Brabender Z-blade mixer. Silicone MB1 was then added to give a volume ratio of EPDM to silicone of 30:70. Mixing of Silicone MB1 and EPDM MB2 was continued to give a dispersion of EPDM MB2 in Silicone MB1.

This product was compounded with 0.6% dicumyl peroxide based on the combined weight of silicone elastomer and EPDM and was moulded into a test sheet. The sheet was cured by heating under pressure in an enclosed metal mould at 170° C. for 10 minutes. The mechanical properties of the cured test sheet were measured and are recorded in Table 1

TABLE 1

| | | Example | | | | | |
| --- | --- | --- | --- | --- | --- | --- | --- |
| | | 1 | 2 | 3 | 4 | 5 | C1 |
| EPDM | % vol | 30 | 30 | 50 | 100 | 0 | 30 |
| Silicone | % vol | 70 | 70 | 50 | 0 | 100 | 70 |
| Shore A hardness | | 38 | 42 | 49 | 76 | 50 | |
| Tensile strength | MPa | 3.0 | 4.3 | 2.1 | 8.3 | 7.3 | 5.5 |
| Elongation | % | 420 | 465 | 229 | 213 | 395 | 369 |
| Tear strength | kNm$^{-1}$ | 18.6 | 23.8 | 7.7 | 55.7 | 12.7 | |
| 100% modulus | MPa | 0.73 | 0.72 | 1.00 | 3.44 | 1.21 | 1.38 |

Dumbbells were cut from the cured test sheets produced in Example 1 and in Comparative Example C1 and were aged at 150° C. over 10 days. Changes in the 100% modulus, elongation at break and tensile strength were measured. The results are shown in Table 2 below.

TABLE 2

| | Example C1 | | | Example 1 | | |
| --- | --- | --- | --- | --- | --- | --- |
| days 150 C. | 100% mod (MPa) | Tensile (MPa) | Elongation (%) | 100% mod (MPa) | Tensile (MPa) | Elongation (%) |
| 0 | 1.38 | 5.5 | 369 | 0.73 | 3.0 | 420 |
| 1 | 1.33 | 3.0 | 208 | 0.81 | 3.2 | 436 |
| 3 | 2.01 | 4.1 | 183 | 0.83 | 3.2 | 443 |
| 5 | 2.41 | 4.0 | 159 | 0.84 | 3.0 | 379 |
| 7 | 2.98 | 4.9 | 199 | 0.87 | 3.2 | 434 |
| 10 | 3.27 | 4.2 | 138 | 0.86 | 3.0 | 358 |

Table 2 shows that there was a significant decrease in elongation at break and a significant increase in 100% modulus for the product of Comparative Example 1, whereas the tensile properties of the product of Example 1 changed only slightly over the 10 days. The observed changes show a loss in elasticity of the peroxide cured composite of the comparative example compared to the composite of Example 1 in which the EPDM is dynamically cured by 'SP1255' resin with ZnO followed by cure of the silicone elastomer phase by peroxide.

EXAMPLE 6

62.5% by weight butyl rubber was mixed at 70° C. with 30% 'MS 75D' fumed silica and 7.5% of the silanol-terminated polydimethylsiloxane used in Example 1, and then with 6.25% 'SP1055' brominated alkylphenol formaldehyde resin and 3.12% zinc oxide to form a butyl rubber masterbatch, hereafter referred to as Butyl MB1

62.5% by weight of a silicone rubber gum was compounded with 30% 'MS 75D' fumed silica and 7.5% of the above silanol-terminated polydimethylsiloxane to form a silicone rubber masterbatch hereafter referred to as Silicone MB2. Silicone MB2 was heated to 80° C. in a Brabender Z-blade mixer at 10 rpm and Butyl MB1 was added to give a volume ratio of butyl rubber to silicone elastomer of 10:90. Mixing was continued for 5 minutes to disperse the Butyl MB1 in the silicone elastomer. The mixer speed was raised to 120 rpm, causing shear heating. At about 100° C., curing of the butyl rubber commenced and shear was continued to dynamically vulcanise the butyl rubber, forming a product comprising cured butyl rubber dispersed in uncured silicone elastomer.

This product was compounded with 0.6% dicumyl peroxide based on the weight of silicone elastomer and press cured into sheets at 170° C. for testing of mechanical properties, which are recorded in Table 3 below.

EXAMPLES 7 AND 8

Example 6 was repeated with the volume ratio of butyl rubber to silicone elastomer being increased to 30:70 in Example 7 and 50:50 in Example 8. The mechanical properties of the cured test sheets are recorded in Table 3 below. Also included in table 3 are the mechanical properties of cured test sheets made from Butyl MB1 and Silicone MB2 cured after compounding with 0.6 parts of dicumyl peroxide

TABLE 3

| Example | Butyl (% vol) | Silicone (% vol) | Shore A | Tensile (MPa) | Elongation (%) | 100% Mod (MPa) | Tear Strength (kNm$^{-1}$) |
| --- | --- | --- | --- | --- | --- | --- | --- |
| Silicone MB2 | 0 | 100 | 70 | 10.0 | 335 | 2.45 | 21.6 |
| 6 | 10 | 90 | 62 | 9.2 | 480 | 1.42 | 34.9 |
| 7 | 30 | 70 | 57 | 7.2 | 681 | 0.87 | 52.1 |
| 8 | 50 | 50 | 60 | 2.8 | 436 | 0.98 | 12.6 |
| Butyl MB1 | 100 | 0 | 62 | 15 | 540 | 1.27 | 35 |

The results listed in Table 3 show that the mechanical properties of the compounds change linearly as a the ratio of butyl to silicone increases from 0 to 30% vol. The modulus and tensile strength drop while elongation and tear strength increase relative to the 100% silicone compound. These silicone-butyl blends have attractive mechanical properties such as increased elongation at break which are not intermediate between the properties of the silicone rubber and butyl rubber compounds.

EXAMPLE 9

100 parts of EPDM MB2 was mixed with 10 parts by weight of 'SP 1055' brominated alkylphenol formaldehyde resin and 5 parts by weight of zinc. The resulting compound was moulded into a test sheet. The sheet was cured by heating under pressure in an enclosed metal mould at 170° C. for 20 minutes. The mechanical properties of the cured test sheet were measured and recorded in Table 4.

EXAMPLE 10

EPDM MB2 was mixed with a sufficient quantity of EPDM to produce a composition containing 10% by weight of MS 75D silica, hereafter referred to as EPDM MB3. 100 parts of EPDM MB3 was mixed with 10 parts by weight of 'SP1055' brominated alkylphenol formaldehyde resin and 5 parts by weight of zinc oxide. The resulting compound was moulded into a test sheet. The sheet was cured by heating under pressure in an enclosed metal mould at 170° C. for 20 minutes. The mechanical properties of the cured test sheet were measured and recorded in Table 4.

COMPARATIVE EXAMPLES C2 AND C3

Examples 9 and 10 respectively were repeated using 0.6 parts by weight of dicumyl peroxide per 100 parts of EPDM MB2 or EPDM MB3 as the curing agent in place of the 'SP1055' resin and zinc oxide. The resulting compounds were moulded into test sheets. The sheets were cured by heating under pressure in an enclosed metal mould at 170° C. for 20 minutes. The mechanical properties of the cured test sheets were measured and recorded in Table 4.

Dumbbells cut from the test sheets of Examples 9 and 10 and Comparative Examples C2 and C3 were heat aged in air at 150° C. over 10 days. The elongation and tensile strength of the samples were measured initially and during the ageing test. The results are shown in Table 4 below.

TABLE 4

| | Example | | | | | | | |
| --- | --- | --- | --- | --- | --- | --- | --- | --- |
| | 8 | C2 | 9 | C3 | 8 | C2 | 9 | C3 |
| | Elongation at break (%) | | | | Tensile strength (MPa) | | | |
| Initial | 213 | 288 | 243 | 327 | 8.3 | 15.5 | 7.6 | 10.6 |
| 1 day | 143 | 77 | 133 | 112 | 12.1 | 2.0 | 6.0 | 2.0 |
| 3 days | 150 | 23 | 150 | 23 | 11.2 | 2.3 | 6.0 | 2.3 |

TABLE 4-continued

| | Example | | | | | | | |
| --- | --- | --- | --- | --- | --- | --- | --- | --- |
| | 8 | C2 | 9 | C3 | 8 | C2 | 9 | C3 |
| | Elongation at break (%) | | | | Tensile strength (MPa) | | | |
| 5 days | 120 | 15 | 128 | 27 | 8.9 | 2.0 | 5.6 | 2.0 |
| 7 days | 132 | 13 | 152 | 20 | 9.9 | 1.9 | 7.4 | 1.9 |
| 10 days | 123 | 13 | 135 | 15 | 8.8 | 2.3 | 6.3 | 2.3 |

It can be seen from Table 4 that, whilst the elongation and tensile strength of the samples cured by peroxide are initially both higher than the elongation and tensile strength of the samples cured by brominated alkylphenol formaldehyde resin, the samples cured by resin retain their mechanical properties much better after ageing at 150° C. The elongation and tensile strength of the samples of Examples 8 and 9 after 10 days heat ageing are higher than the elongation and tensile strength of the samples of Comparative Examples C2 and C3 after only 1 day heat ageing.

EXAMPLE 11

'Therban AT' HNBR was compounded with fumed silica sold under the trade name 'Cab-O-Sil MS 75D' and a silanol-terminated polydimethylsiloxane of viscosity about 20 centiStokes to give a composition consisting of 20% by weight of fumed silica, 5% by weight of silanol terminated polydimethylsiloxane and 75% by weight of Therban AT, hereafter referred to as HNBR MB1. 100 parts of HNBR MB1 was mixed with 10 parts of 'SP 1055' and 5 parts of zinc oxide. The resulting compound was moulded into a test sheet. The sheet was cured by heating under pressure in an enclosed metal mould at 170° C. for 20 minutes. The mechanical properties of the cured test sheet were measured and recorded in Table 5.

COMPARATIVE EXAMPLE C4

100 parts of HNBR MB1 were mixed with 2 parts by weight of dicumyl peroxide. The resulting compound was moulded into a test sheet. The sheet was cured by heating under pressure in an enclosed metal mould at 170° C. for 20 minutes. The mechanical properties of the cured test sheet were measured and recorded in Table 5.

COMPARATIVE EXAMPLE C5

100 parts of HNBR MB1 were mixed with 4 parts by weight of dicumyl peroxide. The resulting compound was moulded into a test sheet. The sheet was cured by heating under pressure in an enclosed metal mould at 170° C. for 20 minutes. The mechanical properties of the cured test sheet were measured and recorded in Table 5.

Dumbells cut from the test sheets moulded from Example 11 and comparative examples C4 and C5 were heat aged in air at 150° C. over 10 days. The elongation and tensile strength of the samples were measured initially and during the ageing test. The results are shown in Table 5 below.

TABLE 5

| | Example | | | | | |
|---|---|---|---|---|---|---|
| | 11 | C4 | C5 | 11 | C4 | C5 |
| | Elongation at Break (%) | | | Tensile strength (MPa) | | |
| Initial | 287 | 517 | 322 | 14.7 | 17.5 | 15.9 |
| 3 days | 184 | 302 | 113 | 11.5 | 6.7 | 5.6 |
| 10 days | 213 | 38 | 35 | 14.6 | 4.3 | 5.2 |

It can be seen from Table 5 that, whilst the elongation and tensile strength of the samples cured by peroxide are initially both higher than the elongation and tensile strength of the samples cured by brominated alkylphenol formaldehyde resin, the samples cured by resin retain their mechanical properties much better after ageing at 150° C. After 10 days heat ageing at 150° C., the elongation and tensile strength of the sample of Example 11 are higher than the elongation and tensile strength of the samples of Comparative Examples C4 and C5. In particular the tensile strength of samples C4 and C5 after 3 days heat ageing are less than that of Sample 11 after 10 days heat ageing. We believe that compositions prepared according to the methods outlined above in Examples 1-3 but using HNBR in place of EPDM elastomer will result in HNBR—silicone elastomer composites with improved resistance to heat ageing.

The invention claimed is:

1. A formable curable elastomer composition comprising a dispersion of a cured organic elastomer in an uncured silicone elastomer, wherein the organic elastomer is cured by a phenol-formaldehyde resin.

2. An elastomer composition according to claim 1, wherein the cured elastomer is an EPDM elastomer.

3. An elastomer composition according to claim 1, wherein the cured elastomer is a butyl rubber.

4. An elastomer composition according to claim 1, wherein the cured elastomer is a hydrogenated nitrile butyl rubber.

5. An elastomer composition according to claim 1, wherein the phenol-formaldehyde resin is an alkylphenol-formaldehyde resin.

6. An elastomer composition according to claim 1, wherein the phenol-formaldehyde resin is used in conjunction with a halogen donor.

7. An elastomer composition according to claim 1, wherein the phenol-formaldehyde resin is halogenated.

8. An elastomer composition according to claim 1, wherein the phenol-formaldehyde resin is a condensation product of a halogen-substituted phenol and formaldehyde.

9. An elastomer composition according to claim 1, wherein the phenol-formaldehyde resin is used in conjunction with zinc oxide.

10. An elastomer composition according to claim 1, wherein the weight ratio of the cured organic elastomer to the uncured silicone elastomer is from 5:95 to 50:50.

11. An elastomer composition according to claim 1, wherein the cured organic elastomer contains a reinforcing filler.

12. An elastomer composition according to claim 1, wherein the uncured silicone elastomer contains a reinforcing filler.

13. A formable curable elastomer composition comprising a dispersion of a curable elastomer compound in an uncured silicone elastomer free of curing agent, wherein the curable elastomer compound comprises an organic elastomer and a phenol-formaldehyde resin curing agent capable of curing the organic elastomer.

14. An elastomer composition comprising a dispersion of a cured organic elastomer in a cured silicone elastomer, wherein the organic elastomer is cured by a phenol-formaldehyde resin.

15. A process for the preparation of a formable curable elastomer composition comprising dispersing a curable elastomer compound in an uncured silicone elastomer free of curing agent and heating the composition to cure the elastomer compound, wherein the curable elastomer compound comprises an organic elastomer and a phenol-formaldehyde resin curing agent capable of curing the organic elastomer.

16. A process according to claim 15 wherein a premixed curable elastomer compound comprising the organic elastomer and the phenol-formaldehyde resin curing agent is dispersed in the uncured silicone elastomer.

17. A process according to claim 15 wherein the organic elastomer is dispersed in the uncured silicone elastomer and the resulting dispersion is mixed with the phenol-formaldehyde resin curing agent to form the dispersion of a curable elastomer blend in an uncured silicone rubber.

18. A process for the preparation of a cured elastomer composition comprising mixing the formable curable elastomer composition of claim 1, which comprises a dispersion of a cured organic elastomer in an uncured silicone elastomer, with a curing agent for the uncured silicone elastomer and heating to cure the uncured silicone elastomer.

19. A process according to claim 18, wherein the curing agent for the uncured silicone elastomer is an organic peroxide.

20. A process according to claim 18, wherein the curing agent for the uncured silicone elastomer comprises a complex of platinum used in conjunction with a polyalkylsiloxane hydride.

* * * * *